(12) United States Patent
Burns et al.

(10) Patent No.: US 12,181,447 B2
(45) Date of Patent: Dec. 31, 2024

(54) DROP TEST FIXTURE

(71) Applicants: Sloan C. Burns, King George, VA (US); Luke Andrew Martin, King George, VA (US)

(72) Inventors: Sloan C. Burns, King George, VA (US); Luke Andrew Martin, King George, VA (US)

(73) Assignee: United States of America, as represented by the Secretary of the Navy, Arlington, VA (US)

(*) Notice: Subject to any disclaimer, the term of this patent is extended or adjusted under 35 U.S.C. 154(b) by 315 days.

(21) Appl. No.: 17/942,356

(22) Filed: Sep. 12, 2022

(65) Prior Publication Data

US 2024/0085292 A1 Mar. 14, 2024

(51) Int. Cl.
*G01N 3/303* (2006.01)
*G01N 3/02* (2006.01)

(52) U.S. Cl.
CPC ............. *G01N 3/303* (2013.01); *G01N 3/02* (2013.01); *G01N 2203/04* (2013.01)

(58) Field of Classification Search
CPC ............. G01N 3/30; G01N 3/303; G01N 3/02; G01N 2203/0033; G01N 2203/04; G01M 7/08; G01L 5/0052
USPC ................... 73/21.01, 12.04, 12.06
See application file for complete search history.

(56) References Cited

U.S. PATENT DOCUMENTS 6,374,661 B1 * 4/2002 Buratynski ............. G01N 3/30
73/12.06

FOREIGN PATENT DOCUMENTS

CN 111397827 A * 7/2020 ............. G01M 7/08

* cited by examiner

*Primary Examiner* — Benjamin R Schmitt
(74) *Attorney, Agent, or Firm* — Gerhard W. Thielman (57) ABSTRACT

A test fixture is provided for dropping an article from a height to a floor, with the article oriented in relation to the floor at a select angle. The fixture includes a column frame, an overhead beam, a carriage, first and second guy wires, first and second spools, and first and second chains. The frame supports first and second guide arms on opposing sides. The overhead beam has a distance span substantially parallel to the floor. The guy wires attach to the beam separated the span and pass through the guide arms. The spools receive the corresponding guy wires. The chains suspend the article from the carriage above the floor. Upon release of the guy wires, the carriage falls until contact with the guide arms while the article contacts the floor.

7 Claims, 6 Drawing Sheets

DROP TEST FIXTURE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to test structures for dropping articles. In particular, the invention relates to such structures to suspend articles at controlled angles from which to fall and strike ground at such angles.

Drop tests are conducted to determine whether sensitive equipment can withstand impact from falling to the ground. This can be accomplished by building a test rig that suspends the test object or article from a set elevation above its rigid floor, and then releasing the article so that gravity accelerates that article until reaching the floor. Such tests are routinely conducted on missile components, many of which are cylindrically symmetrical.

SUMMARY

Conventional drop test fixtures yield disadvantages addressed by various exemplary embodiments of the present invention. In particular, various exemplary embodiments provide a test fixture for dropping an article from a height to a floor, with the article oriented in relation to the floor at a select angle. The fixture includes a column frame, an overhead beam, a carriage, first and second guy wires, first and second spools, and first and second chains. The frame supports first and second guide arms on opposing sides. The overhead beam has a distance span substantially parallel to the floor.

The carriage is disposed substantially parallel to the floor and has first and second opposing guides separated by the span. The guy wires attach to the beam separated the span and pass through the guide arms. The first and second spools to receive the corresponding guy wires. The first and second chains suspend the article from the carriage above the floor. Upon release of the guy wires, the carriage falls until contact with the guide arms while the article contacts the floor. Additionally, rods connected at the ends of article and suspended from the carriage to further ensure the article's angle.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (in or °), mass in pounds-mass ($lb_m$), angles in degrees (°), force in pounds-force ($lb_f$). Supplemental measures can be derived from these, such as density in grams-per-cubic-centimeters ($g/cm^3$), moment of inertia in gram-square-centimeters ($kg\text{-}m^2$) and the like.

Drop tests are conventionally performed with an article oriented such that its longitudinal axis is substantially parallel to the floor onto which it will impact. However, to properly evaluate the robustness of military hardware, such tests should also be conducted at select angles to evaluate asymmetrical impact loading. Such capability is conventionally either lacking or inadequate.

Figure 1:
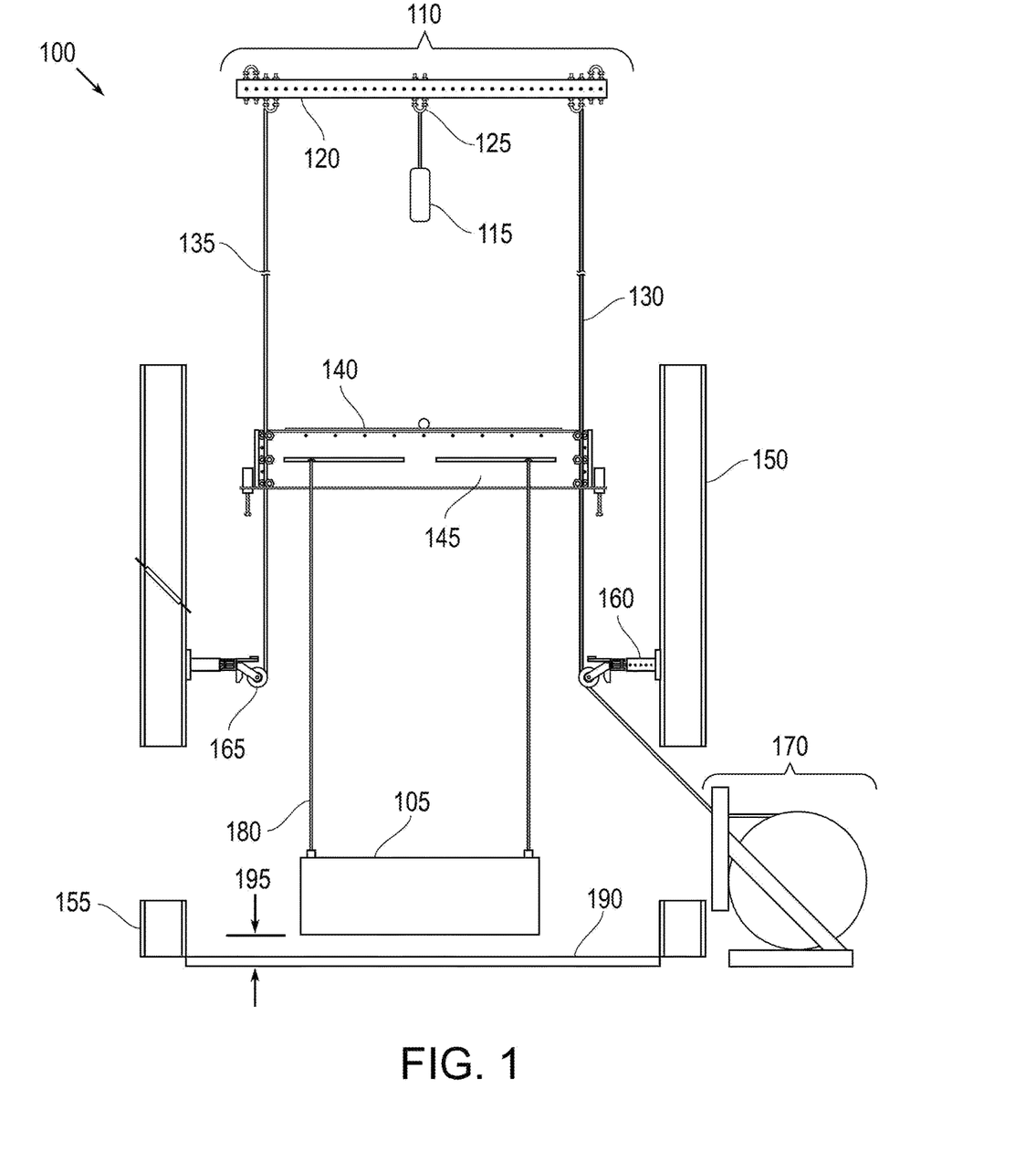
FIG. 1 is an elevation schematic view of a test fixture.

FIG. 1 shows an elevation view 100 of for drop testing an experimental article 105 via an exemplary test fixture 110. A weight release 115 is suspended from an overhead lifting beam 120 with a support U-bolt 125. A pair of cables or guy wires 130 hang from the beam 120, separated by a horizontal span, with symbolic breaks 135 to indicate optional extended lengths. The beam 120 is composed of attach points for the guy wires 130, the support hook 125 and a crane or tower (not shown). A rectangular carriage 140 suspended horizontally along its longitudinal axis with co-linear slots 145 secures the guy wires 130 across that span below the beam 120. The carriage 140 is composed of aluminum and has a rectangular cross-section.

Two more U-bolts 125 are disposed atop the beam 120 used to attach to the crane, which lifts the entire assembly. This means that hoisting the beam 120 in the air, also raises the carriage 140 and the article 105. When detached by release 115, the carriage 140 and article 105 fall together, while the text fixture 110 remains hoisted by the crane, providing tension in the guy wires 130 so that the carriage 140 can smoothly run down them.

The test fixture 110 is supported by two cage columns 150 that form a drop cage structure from its base 155 so as to flank the carriage 140. The text fixture 110 is supported by a crane or tower (not shown). An adjustable guide arm 160 extends inward from each cage column 150, terminating in a tensioning roller 165. The columns 150 merely provide means to attach the guide arms 160. These arms 160 control the width of the guy wires 130 to have consistent distances apart at the beam 120, the carriage 140, and the guide arms 160, which can also include dampers to restrict damage to the carriage 140. The secondary purpose of the columns 150 is to facilitate explosive or propulsive test items that need a restraint cage.

A cable spool 170 with a retractor either feeds or withdraws each guy wire 130. The article 105 is suspended from the carriage 140 by chains 180 connected thereto at opposite ends of the article 105, and can be dropped to collide with a flat surface or floor 190 on the ground from a select height 195. Both the beam 120 and the carriage 140 are disposed to be substantially parallel to the horizontal floor 190.

As an anticipatory explanation, the co-linear slots 145 (or mounting locations 320 in FIG. 3) are used to align the chains 180 (and/or rods 760 in FIG. 7) with the attach points (on the instrument 230 in FIG. 2) on the article 105. This simply enables the attachment points to translate as tilt (i.e., impact angle 240 in FIG. 2) is altered. To maintain horizontal alignment parallel to the floor 190 during its drop, the carriage 140 includes mechanisms (V-grooves 375 in the rollers 370 in FIG. 3). The beam 120 is hoisted by a crane by the two U-bolts 125. The weight release 115 secures the carriage 140 to the beam 120 for lifting. When the release 115 detaches, the beam 120 stays suspended by the crane so that the guy wires 130 remain tensioned.

Figure 2:
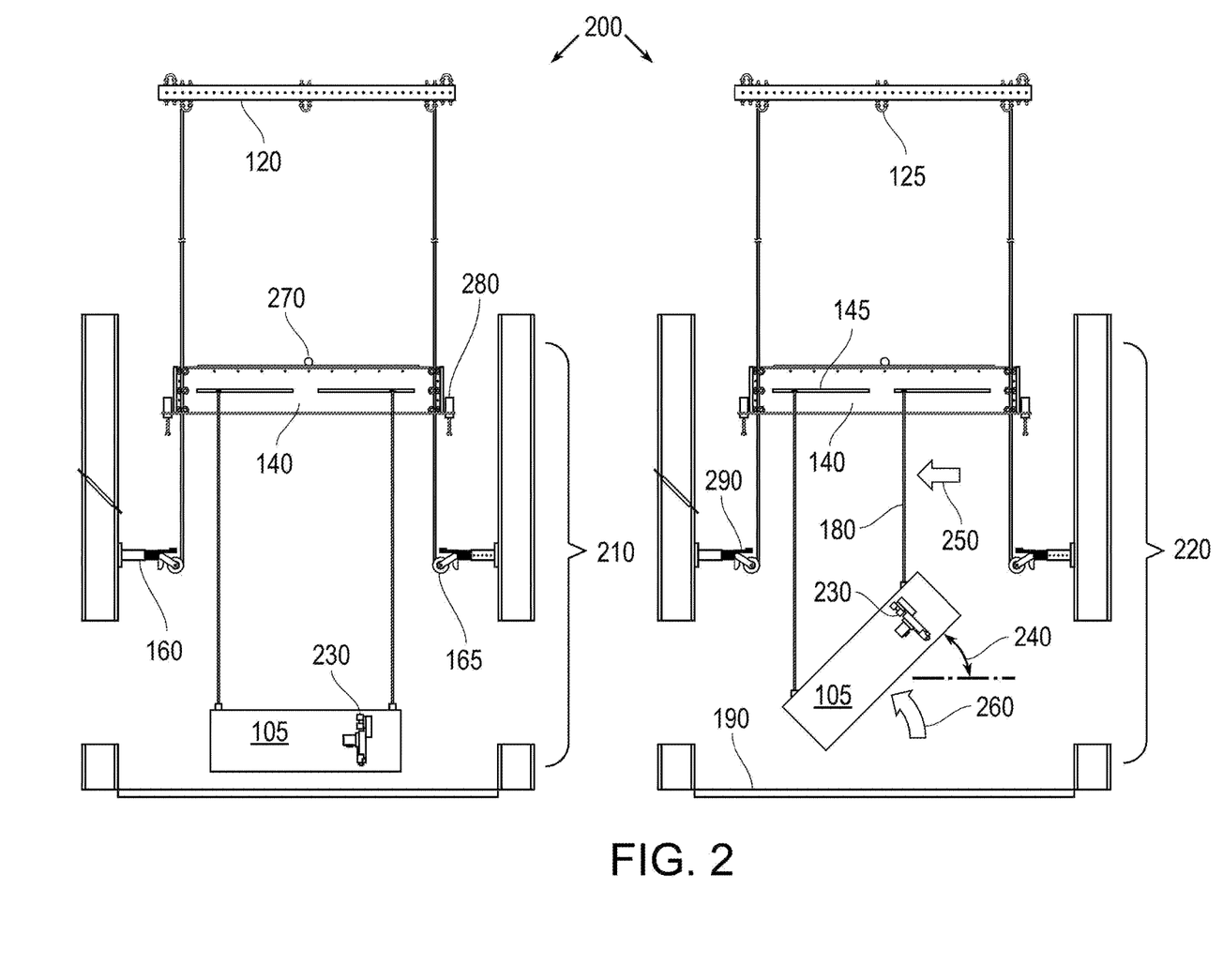
FIG. 2 is an elevation schematic view of the test fixture with a test article in level and angle orientations.

FIG. 2 shows an elevation view 200 of the text fixture 110 in horizontal 210 and tilt 220 orientations for the article 105. An orientation instrument 230 measures the tilt in angle 240 of the article 105 from horizontal, such as in relation to the floor 190. The tilt angle 240 increases as one chain 180 shortens and translates inward as direction arrow 250 so as to pivot the article 105 by angular arrow 260 from horizontal. Note that horizontal and vertical axes would be respectively parallel and normal to the floor 190.

An attach eyelet 270 attaches to the carriage 140 at its center to provide a connection point with the weight release 115. At each longitudinal tip, the carriage 140 terminates with a strike bracket 280. At each longitudinal tip, the carriage 140 terminates with a strike bracket 280. Each guide arm 160 includes a stop plate 290 (depicted as a damper) to receive its corresponding strike bracket 280 upon impact.

Figure 3:
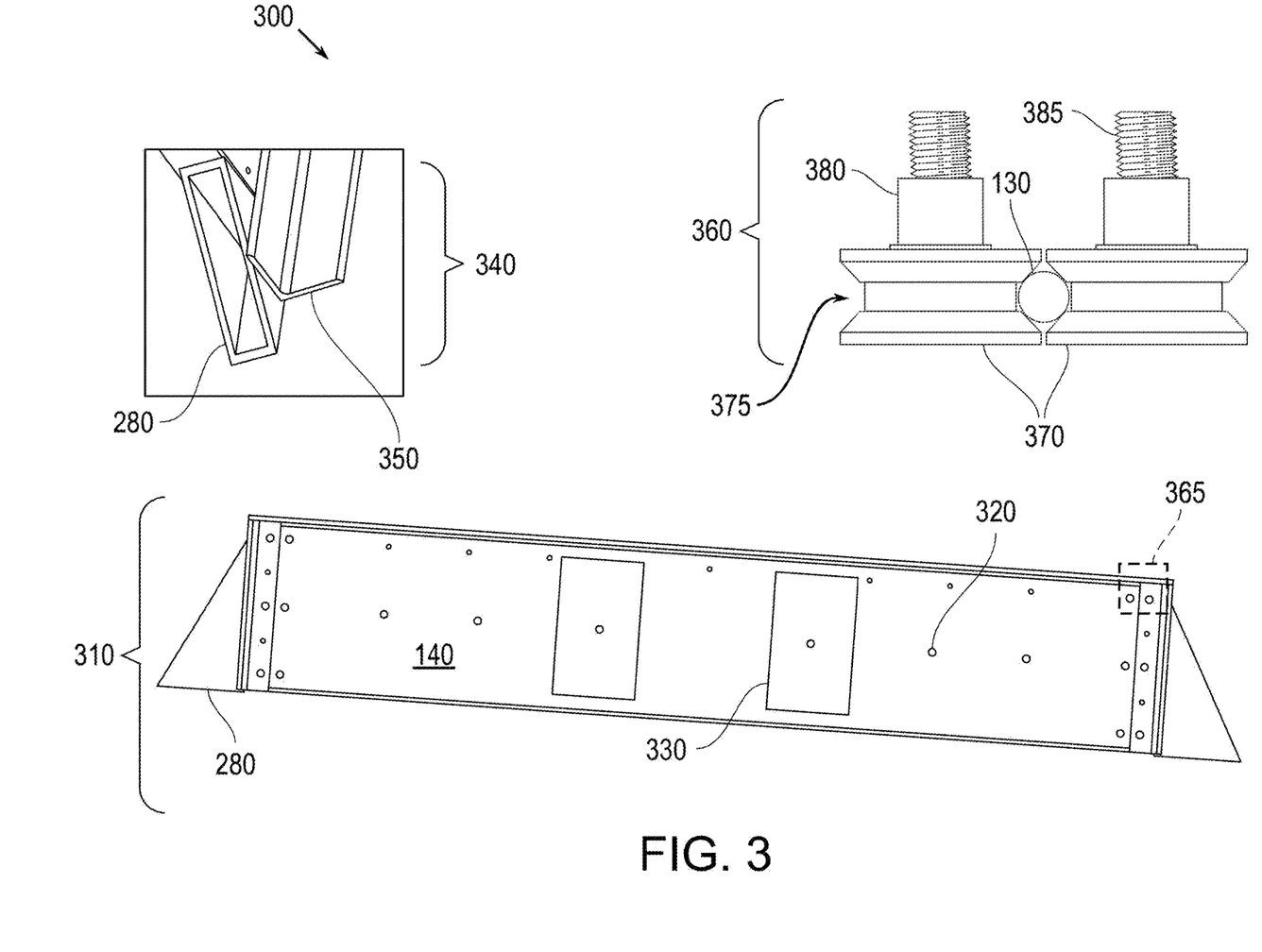
FIG. 3 is a set of elevation and perspective views of a carriage.

FIG. 3 shows an elevation view 300 of a bracket assembly 310 that includes the carriage 140 that longitudinally terminate in strike brackets 280. The carriage 140 has been tested with aluminum due to ease of machinability, but steel or other convenient metal could be used. The carriage 140 includes eight mounting locations 320 to enable set a variety of tilt angles 240. Optional panels 330 with two of these locations 320 in this example enable replacing damaged mounts without scrapping the carriage 140. The mounting locations 320 can preferably substitute the adjustment slots 145 to improve stiffness of the carriage 140 for heavier loads. A detail perspective view 340 of the dampers 280 show an L-shape bracket 350 that fastens along the carriage 140 for further stiffening. The brackets 280 can include either shock absorbers or crush pads to cushion impact into their respective stop plates 290 on the guide arms 160.

A detail plan view 360 shows an upper corner 365 of the carriage 140, including a pair of guide rollers 370 that flank their corresponding guy wire 130 between their V-grooves 375. There are three sets of rollers 370 along the vertical extent of the carriage 140 on either end through which to guide the guy wire 130. A stud 380 connecting to a threaded shaft 385 turns each roller 370 as the carriage 140 travels up and down the guy wires 130. The distance between the race wheels 370 and the guy wire 130 can be fine-tuned by rotating the stud 380, and turning the rollers 370 up and down by translation increments $\frac{1}{32}$". The rollers 370 were selected to enable a precise fit to the guy wires 130 so as to have light contact in the V-groove 375 but not so much that friction attenuated the impact velocity of the article 105 to the floor 190.

Figure 4:
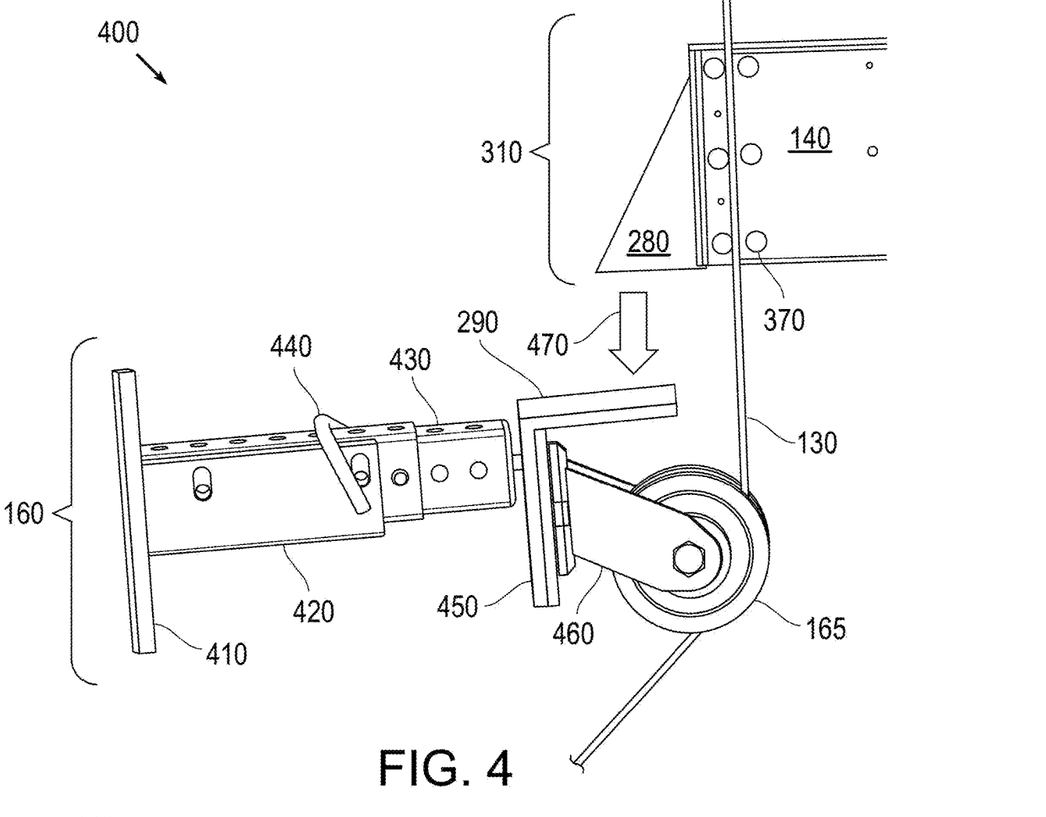
FIG. 4 is an elevation detail view of a guide arm and strike bracket.

FIG. 4 shows an elevation detail view 400 of the guide arm 160 that attaches to its column 150 by a plate 410 and the strike brackets 280. A telescoping rectangular sleeve 420 receives an extender 430 and locked by a removable pin 440. The extender 430 supports a roller flange 450 that includes the stop plate 290. A caster 460 attaches the tensioning roller 165 to the flange 450. The tensioning roller 165 maintains the tautness of the guy wire 130 while the mass along its length translates. This enables the guy wires 130 at the spool 170 to avoid the impact area of the article 105. As the carriage 140 drops along the guide wires 130 between the rollers 370 along direction arrow 470, the stop plate 290 on the guide arm 160 halts the strike bracket 280 from further descent, thereby preventing the carriage 140 from falling onto the article 105.

Figure 5:
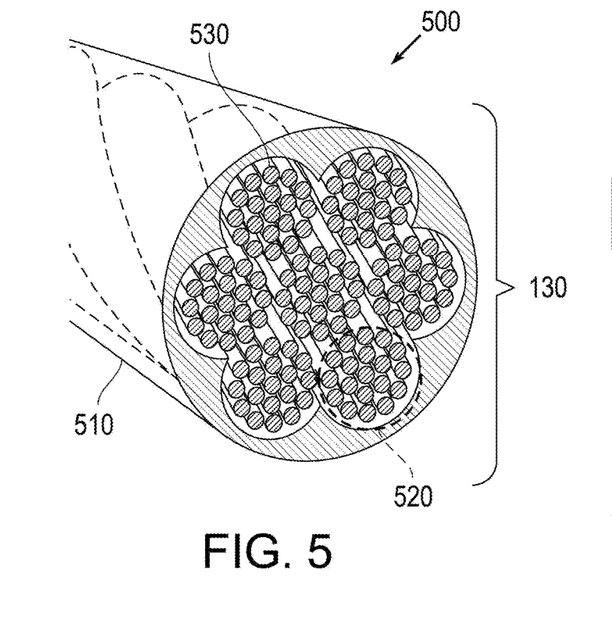
FIG. 5 is a see-through perspective view of a cable.

FIG. 5 shows a see-through perspective view 500 of the guy wire 130, which constitutes a nylon coated rope 510 of galvanized steel. The guy wire 130 comprises seven bundles 520 of nineteen strands 530. This can be referred to as 7×19 construction. The nylon coating provides a smooth constant diameter for operation between the rollers 370. The coated bundles 520 have an outer diameter of $\frac{3}{8}$". The bare wire strands 530 having $\frac{1}{4}$" diameter are twisted together as a 4359T35 wire rope. The guy wires 130 are tensioned by clamping the guy wire 130 in the spool 170 so that the ground end is fixed. When the beam 120 is raised to the proper height, the guy wire 130 clamps contact the spool 170 so that no more guy wire 130 can pay out.

Figure 6:
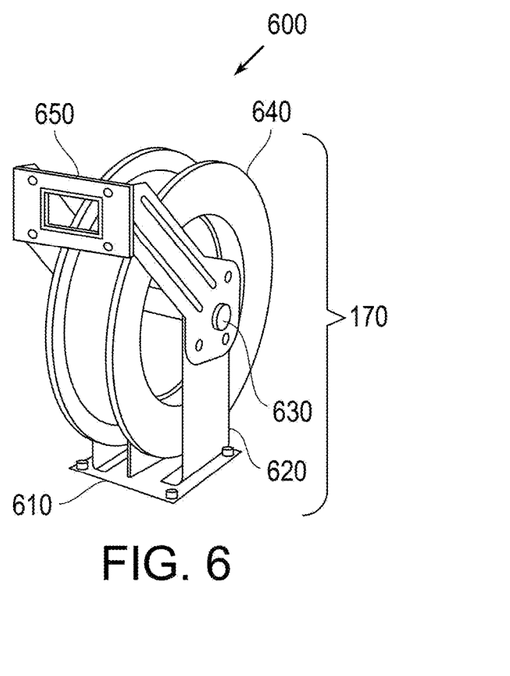
FIG. 6 is a perspective view of a cable spool.

FIG. 6 shows a perspective view 600 of the wire spool 170 with ~0.7 short ton load capacity. The spool 170 includes a base 610 mounted to the floor 190. Support flanges 620 attach to the base 610. A shaft 630 connects between the flanges 620 to rotate drum wheels 640 around which the guy wire 130 winds, after being drawn through a guide window 650 and held by a clamp (shown in FIG. 10). The outer diameter of the drum wheels 640 is $9\frac{3}{4}$".

Figure 7:
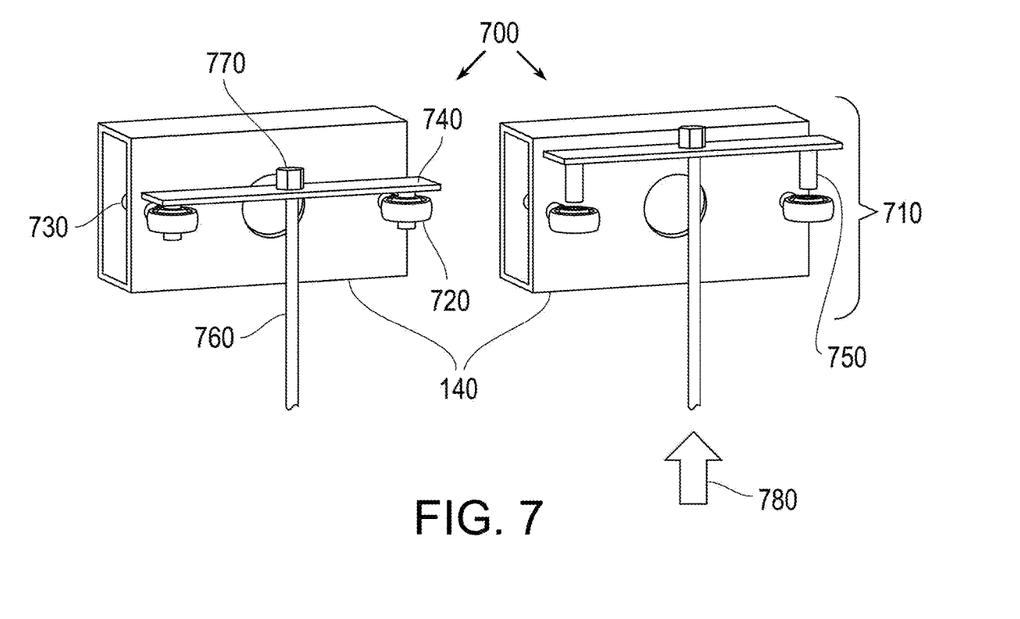
FIG. 7 is a perspective view of a stiffness mount.

FIG. 7 shows a perspective view 700 of an optional stiffness mount 710 for hanging the article 105, separating at its impact to the floor 190. The mount 710 is illustrated on the left side prior release of the guy wires 130, and on the right side, after the article 105 impacts the floor 190. The mount 710 includes a rectangular box frame of the carriage 140. A pair of ball joints 720 disposed horizontally from each other attach near opposite ends of the frame by horizontal studs 730. An elevation bracket 740 extends across the ball joints 730 and pass through via vertical studs 750. A center rod 760 is suspended from the bracket 740 by a $\frac{3}{8}$" diameter hexagonal nut 770 from which the article 105 hangs at one end. The size of the nut 770 is exemplary only. A vertical force 780 pushes the rod 760 up and the rods 750 out of their rings 730 from recoil of the article 105 bouncing from the floor 190.

The spool 170 pays out the guy wire 130 as the overhead beam 120 is raised. When the beam 120 has reached the desired height, clamps (as mechanical stops) on the guide wire 130 contact the spool 170, tensioning the guy wires 130. The tensioned guy wire 130 becomes sufficiently stiff to act as a bearing surface for the carriage 140. The bracket 740 acts as a hanger for the rods 760 used to suspend the article 105. The brackets 740 enable the rods 760 to disconnect from the carriage 140 when the article 105 strikes the floor 190.

Figure 8:
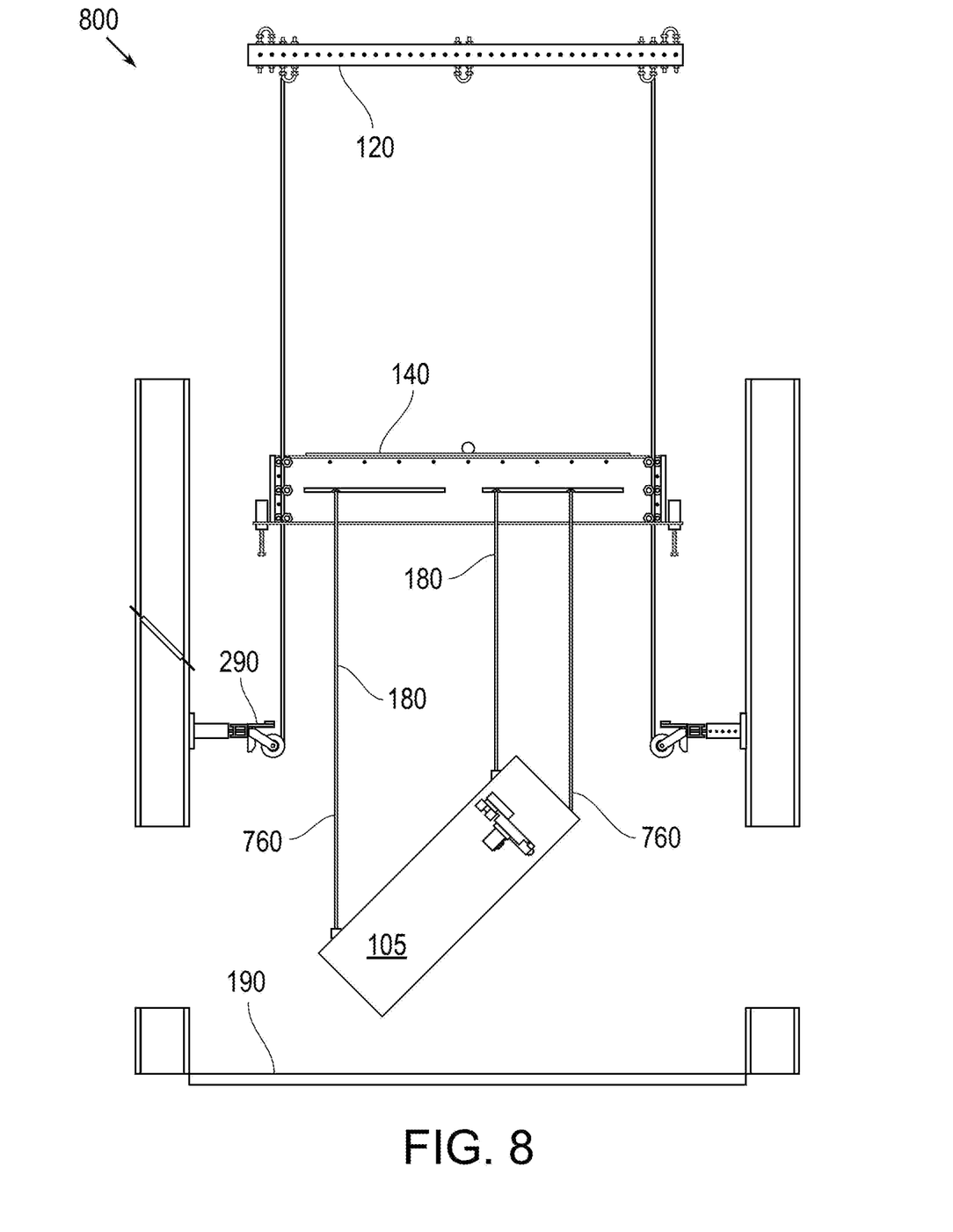
FIG. 8 is an elevation view of the test fixture with stiffness mounts.

FIG. 8 shows an elevation view 800 of the test fixture 110 for hanging the article 105, including stiffness mounts 710 attached to the carriage 140. As shown in view 200, the article 105 is suspended from the carriage 140 by chains 180 positioned along the slots 145 to set the desired angle 240. In this alternative configuration, the article 105 is additionally suspended by thin rods 760 on either side, each connected to its corresponding mount 710.

The rods 760 are used on either side or both ends of the article 105 in order to (a) maintain the proper angle in circumstances in which the mounting location of the chain 180 cannot perfectly align with the center of gravity of the article 105, and (b) restrain against rotational forced caused by aerodynamic loading of the asymmetric body suspended at a tilt angle. Both chains 180 and rods 760 attach to the article 105 on opposing sides of its cylindrical periphery. Although both provide some measure of stiffness, their effects shift between pre-drop and post-drop conditions.

Figure 9:
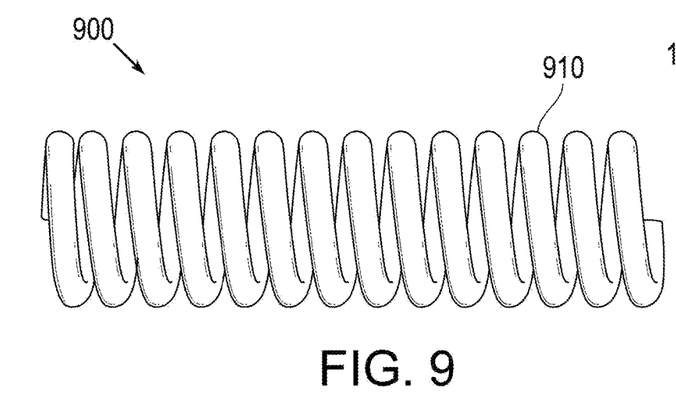
FIG. 9 is an elevation view of a compression spring.
Figure 10:
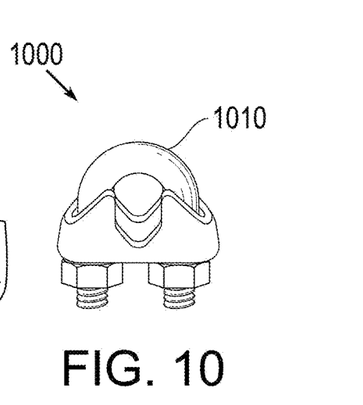
FIG. 10 is an elevation view of a clamp.

FIG. 9 shows an elevation view 900 of a helical compression spring 910 designated 1986K995 and composed of 302 stainless steel. The coil spring 910 has a length of 3.5", an outer diameter of 1.0", an inner diameter of 0.676" and a wire diameter of 0.162". This enables a spring rate of 127.4 $lb_f/in$ and a maximum load of 108.5 $lb_m$. The spring 910 enables the guy wire 130 to be retracted when lowering the beam 120 without personnel being in harms way. FIG. 10 shows an elevation view 1000 of a wire clamp 1010. The wire spool 170 is used to set the height of the lifting beam 120 along with the article 105. Wire clamps 1010 attached to the guy wire 130 engage with the spring 910 to create tension in the guy wires 130 when fully elevated. Oversized washers prevent the spring 910 and the clamp 1010 from passing through the guide window 650.

The material used to suspend the article 105 must be relatively stiff in tension. Chains 180 provide proper suspension material because of their low stretch in tension and lack of stiffness in all other loading conditions. The stiffness in other planes (i.e., compression, bending, or shear) can be augmented by using the thin rod 760 (all-thread) for articles 105 of unwieldy geometry, asymmetric drag forces, or inability to balance at the desired impact orientation (i.e., 45° impact angle).

Such a thin rod 760 having a slenderness ratio of greater than twenty diameters buckles under insignificant loads compared to the impact loading from the article 105 striking the floor 190 as its impact surface. The thin rod 760 can be replaced economically if damaged from a drop test. Under such conditions, the thin rods 760 pushes upward with force 790 as the carriage 140 continues to fall until the stop plates 290 arrest its descent. Thus, the stiffness mount 710 enables the rods 760 to disconnect from the carriage 140.

The mount 710 uses two ball joints 730 attached to the carriage 140 and a bracket 740 forming a T-type hanger for the thin rod 760 with two studs 750 equidistant from the thin rod 760, being in the center the hanger. The two studs 750 slide into the ball joints 730 attached to the carriage 140 and slide out of the ball joints 730 under very small compressive loads, therefor disconnecting the article 105 from the carriage 140 at impact with the floor 190.

The center of gravity of the carriage 140 with symmetrical aerodynamic drag and chains 180 used to suspend the article 105 cannot be balanced under the carriage 140 within the length between the stop plates 290. Additionally, the article 105 is positioned in an aerodynamically asymmetrical orientation and tends to lift the downward end. Hence, the thin rod 760 assists in balancing and to restrict aerodynamic drag forces.

The commanded descent of the carriage 140 causes the article 105 to drop and contact the floor 190. In configuration shown in view 100, the article 105 being horizontal is supported by chains 180 because aerodynamically symmetry. As an important note: rope was initially used for this purpose. However, rope acts as a spring, and permitting slack in such rope upon release of the carriage 140, which cannot maintain a horizontal position for the article 105. Chains 180 are sufficiently stiff to inhibit observable slack. In the angle drops as in view 800, there is an asymmetric aerodynamic load, so the chains 180 are inadequate to maintain parallel and hence the need for rods 760.

The exemplary support structure as test fixture 110 can be used to achieve the ±10° impact angle requirements of STANAG 4375, MIL-STD-331C, and MIL-STD-2105 for items of complex geometry or stable axes outset from the desired drop axis. Some test articles 105 have geometries that so challenging or impossible to determine the proper starting angle in order to achieve a desired impact angle 240 after a free fall drop. Exemplary embodiments provide the test fixture 110 as a technique to secure the article 105 at a desired impact angle 240. This fixture 110 maintains that angle 240 throughout the drop until impact with the floor 190.

The carriage 140 suspends the test article 105 at a specified angle 240. The carriage 140 runs along guy wires 130, paid out by spools 170 affixed to the floor 190 and tensioned via a clamp 1010 and spring 910 mounted on the guy wires 130 meeting the strike bracket 280 on the stop plate 265. The overhead beam 120 is used to raise the guy wires 130 and the weight release 115. The carriage 140 attaches to the weight release 115, and suspended from the carriage 140 is the article 105.

Firing (or severing) of the weight release 115 causes the carriage 140 and article 105 to fall. The carriage 140 remains horizontal, while the article 105 maintains its angle 240 by the guy wires 130, which pass through rollers 370 mounted on the carriage 140. The article 105 strikes the floor 190 or other desired impact surface, which is typically a steel plate, and the carriage 140 comes to rest on the strike flanges 290. With sufficient mass used to suspend the article 105 from the carriage 140, the article 105 can rebound freely without significant effects from the carriage 140.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A test fixture for dropping an article from a height to a floor, said article oriented in relation to said floor at a select angle, said fixture comprising:

a column frame for supporting first and second guide arms on opposing sides;

an overhead beam having a distance span substantially parallel to the floor;

a carriage substantially parallel to the floor, said carriage having first and second opposing guides separated by said span;

first and second guy wires attaching to said beam separated by said distance span and passing through said guide arms;

first and second spools for receiving corresponding said guy wires; and first and second chains for suspending the article from said carriage above the floor, wherein upon release of said guy wires, said carriage falls until contact with said guide arms while the article contacts the floor.

2. The fixture according to claim 1, further including:

first and second bars attaching to the article, being suspended from said carriage until the article contacts the floor.

3. The fixture according to claim 1, wherein each guide include an opposing set of wheels that wrap corresponding said guy wire.

4. The fixture according to claim 1, wherein said carriage at opposing ends includes first and second strike brackets.

5. The fixture according to claim 4, wherein each guide arm of said first and second guide arms includes a stop plate to intercept a corresponding strike bracket on said carriage upon said release of said guide wires.

6. The fixture according to claim 1, wherein each guide arm of said first and second guide arms includes a roller extending inward to maintain tension of a corresponding guy wire of said first and second guy wires between said carriage and a corresponding spool of said first and second spools.

7. The fixture according to claim 1, wherein said carriage includes longitudinal slots along which to attach said chains, enabling the article to tilt at the set angle in relation to the floor.

* * * * *